United States Patent [19]

Rolando et al.

[11] Patent Number: 5,124,406
[45] Date of Patent: Jun. 23, 1992

[54] EPOXY ESTER COPOLYMER FROM FATTY ACID-STYRENE BASE

[75] Inventors: Thomas E. Rolando, Minnetonka; Roger A. Schmidt, Chanhassen; K. A. Pai Panandiker, Shorewood, all of Minn.

[73] Assignee: Cargill, Incorporated, Minneapolis, Minn.

[21] Appl. No.: 635,412

[22] Filed: Dec. 28, 1990

Related U.S. Application Data

[63] Continuation of Ser. No. 340,171, Apr. 12, 1989, abandoned.

[51] Int. Cl.$^5$ ............... C08G 59/14; C08G 59/16
[52] U.S. Cl. .................. 525/119; 525/111.5; 525/112; 525/530; 525/531; 523/454; 523/455
[58] Field of Search ............ 525/119, 111.5, 112, 525/530, 531; 523/454, 455

[56] References Cited

U.S. PATENT DOCUMENTS

| | | | |
|---|---|---|---|
| 4,151,131 | 4/1979 | Sekmakas et al. | 523/423 |
| 4,166,054 | 8/1979 | Meeske et al. | 523/423 |
| 4,212,776 | 7/1980 | Martinez et al. | 523/414 |
| 4,309,321 | 1/1982 | Aihara et al. | 524/513 |

OTHER PUBLICATIONS

98: 91128k Water-thinnable air drying & forced drying paint. Friedrich, Kan et al. Ger. (East) DD 156,087 (Cl.C09D3/66), Jul. 28, 1982, Appl. 227,385. Feb. 3, 1981; 15 pages.
98: 91131f Water dispersed resins. Sekisui Chemical Co., Ltd. Jpn. Kokai Tokkyo Koho JP 57,143,312 [82,143,312] Cl. C08F265/06, Sep. 4, 1982, Appl. 81/28,2996, Feb. 28, 1981; 11 pages.
97: 199606h Water-soluble epoxy vehicles. Krishnamurti, N. et al. (Reg. Res. Lab., Hyderabad, 500 009 India). *J. Colour Soc.* 1982, 21(1), 3-9 (Eng).
90: 12353d Air drying thermosetting aqueous epoxy-acrylic copolymer coating systems. Sekmakas, Kazys et al. (De Soto, Inc.) U.S. 4,133,790 (Cl. 260-29.6NR1 C08J3/06), Jan. 9, 1979, Appl. 752,805, Dec. 20, 1976; 5 pages.
90: 123264e Soluble, hydroxyl group-containing copolymers in organic solvents. Katsimbas, Themistoklis (Hoechst A.-G.) Ger. Offen. 2,732,693 (Cl C08F220/00), Jan. 25, 1979, Appl. Jul. 20, 1977; 27 pages.

*Primary Examiner*—Robert E. Sellers
*Attorney, Agent, or Firm*—Fitch, Even, Tabin & Flannery

[57] ABSTRACT

The present invention relates to an epoxy ester coating copolymer resin which is useful in the preparation of an air curable, high solids coating, which resin is the reaction product of components (I), (II) and (III); wherein (I) is a polymerizable base of (a) a fatty acid having free radical polymerizable double bonds and (b) a vinyl monomer selected from the group consisting of styrenes, vinyl toluene and mixtures thereof; (II) is an epoxy resin and (III) is a monobasic acid. The epoxy ester copolymer resin of the invention is prepared by the reaction of (I), (II) and (III) at an elevated temperature to an acid number below 10.

14 Claims, No Drawings

EPOXY ESTER COPOLYMER FROM FATTY ACID-STYRENE BASE

This application is a continuation of application Ser. No. 340,171 filed Apr. 12, 1989, now abandoned.

This invention relates to an environmentally acceptable air curable epoxy ester copolymer resin suitable for use in high solids solvent-resin coating systems and having performance comparable to that of conventional solvent-resin coating systems. The high solids epoxy ester resins of this invention have low volatility and contain no significant amounts of unreacted monomers.

BACKGROUND OF THE INVENTION

With the advent of increasingly stringent environmental regulations, the amount of volatile organic compounds (VOC's) present in liquid paint materials has come under increasingly stringent controls regarding both the nature and the quantity of such VOC emissions. Aromatic solvents such as benzene, toluene and xylene, some of the more powerful solvents for liquid coatings, have been highly restricted, particularly in industrial environments, because of their suspected carcinogenic nature and the contribution such solvents make to photochemical smog and other air pollution problems in an urban environment. As a consequence of such restrictions, the coating industry has increased its use of high solids coatings in order to lower VOC emissions. In general, the coatings industry regards a low VOC air dry coating as one which contains less than about 3.5 lbs. of solvent per gallon of coating. For some applications in some areas of the country, the figure may be as low as 2.8 lbs. of solvent per gallon.

There have been numerous proposals for the manufacture of high solids coating compositions. For example, U.S. Pat. No. 4,397,989 to Adesko is directed to a high solids coating composition which contains at least 40% by weight of a binder of film-forming constituents in which the constituents are: (1) an acrylic polymer of styrene or methylmethacrylate or mixtures thereof, an alkyl acrylate or an alkyl methacrylate and a hydroxyl alkyl acrylate or methacrylate (2) a polyester polyol and (3) an alkylated melamine formaldehyde cross-linking agent and optionally, an acid catalyst. The composition is particularly useful, as a primer, or an exterior finish for automobiles, trucks and airplanes, and can be used as an appliance finish and for coil coatings.

U.S. Pat. No. 4,477,534 to Antonelli et al. discloses air-drying resins such as acrylate- or methacrylate-acid drying-oil resins and alkyds which can be blended with up to 70% by weight of the combined weights of a vinyl oxazoline ester as a reactive diluent. In an organic solvent, the blend produces a suspension or solution which has a lower viscosity than a suspension or solution of resin alone but with the same percentage of solids. When applied to a substrate, the blend dries in air to a good protective and ornamental coating. The oxazoline ester can be combined with up to about twice its weight of certain melamine condensates.

U.S. Pat. No. 4,166,054 to Meeske et al. discloses an aqueous system which includes an epoxy resin copolymer which is an air curable resin solution useful for surface coating and impregnation comprising (I) the reaction product of (A) from about 50% to about 65% by weight based upon the total weight of (A) and (B) of an epoxy resin ester of a partially conjugated unsaturated fatty acid and (B) from about 50% to about 35% by weight based upon the total weight of (A) and (B) of a blend of reactive monomer possessing reactive double bonds, at least one of which must be an unsaturated mono-basic acid in the presence of (II) an alcohol ether of a glycol and subsequently reacted with (III) an amine and then (IV) dispersed in water, wherein the epoxy resin of component (A) is the reaction product of 2,2,bis(4 hydroxyphenyl) dimethylmethane and epichlorohydrin, and has a melting point from about 130.F. to about 230.F. and an epoxide equivalent weight within the range from about 400 to about 1100, and the fatty acids used are straight chain monobasic acids of 18 carbon length having double bonds arranged in the chain in an amount and position to give an iodine number of 125 to 185, an acid number of from about 180 to 210 and a percentage of conjugation of the double bonds between 20% and 25% wherein the reaction is carried out to an acid number below 10 and the monomer (B) portion consists of a mixture of 20-28% of unsaturated monobasic acids having a polymerizable double bond and 80% to 72% reactive monomers having a polymerizable double bond.

U.S. Pat. No. 4,224,202 to Heiberger discloses a high-solids coating composition containing an unsaturated fatty acid alkyd resin, an alkyl dimethacrylate or trimethacrylate monomer, a protected cobalt oxime catalyst, and a polar solvent. The di- or trimethacrylate monomer cross-links with the alkyd and becomes part of the solid paint film.

High solids resins which have the desired low VOC characteristics have sometimes been obtained by lowering the copolymer molecular weight and by using stronger solvents to form a more solubilized coating system. In order for such a system to be commercially successful, it is necessary to maintain the drying rate and film properties associated with higher molecular weight copolymers used in solvent-resin coatings. This invention relates to the preparation of epoxy ester copolymer resins which retain the drying rate and film properties associated with the higher molecular weight copolymers and which are suitable for use in the formulation of low VOC coatings.

SUMMARY OF THE INVENTION

The present invention relates to an air curable high solids epoxy ester coating resin which is the reaction product of components (I), (II) and (III); wherein (I) is a polymerizable base which is the reaction product of (a) a fatty acid having polymerizable double bonds and (b) a vinyl monomer selected from the group consisting of styrene, alpha-methyl styrene, vinyl toluene such as para-methyl styrene and mixtures thereof; (II) is an epoxy resin; and (III) is a monobasic acid or mixture of monobasic acids.

The air curable epoxy ester resin of the invention is prepared by the reaction of (I), (II) and (III) at an elevated temperature to an acid number below 10.

DETAILED DESCRIPTION OF THE INVENTION

This invention relates to an air curable epoxy ester copolymer resin suitable for use in low VOC coating systems. The coating systems may be cured at ambient temperatures or may be force cured at elevated temperatures up to about 180° F.

The epoxy ester copolymer resin is prepared by the reaction of a polymerizable base (I) derived from the reaction of (a) a fatty acid having polymerizable double bonds and (b) a vinyl monomer selected from the group consisting of styrene, alpha-methyl styrene, vinyl toluene such as para-methyl styrene and mixtures thereof; an epoxy resin (II); and a monobasic acid or mixture of momobasic acids (III).

In accordance with the present invention, the polymerizable base (I) comprises from about 10% to about 70% by weight of the epoxy ester copolymer resin. The polymerizable base is made by the reaction of (a) a fatty acid having polymerizable double bonds with (b) a monomer or mixture of monomers having at least one polymerizable double bond which is reactive through a free radical mechanism, wherein the monomer is a vinyl monomer selected from the group consisting of styrene, alpha-methyl styrene vinyl toluene such as para-methyl styrene and mixtures thereof with or without an additional vinyl monomer. The polymerizable base (I) comprises about 25-75% by weight of the fatty acid, and about 75-25% by weight of the vinyl monomer.

The additional vinyl monomer is preferably selected from those vinyl monomers known for use in the resin industry, such as allyls, acrylates and methacrylates. Most preferably, the additional vinyl monomers are selected from the group consisting of acrylonitrile, vinyl acetate, and acrylics or acrylates such as, acrylic acid, methyl methacrylate, ethyl methacrylate, propyl methacrylate, butyl metracrylate methacrylate, isobutyl methacrylate and methacrylic acid.

The fatty acids (a) having polymerizable double bonds are selected from monobasic unsaturated fatty acids with at least one conjugated double bond which is reactive through a free radical mechanism. The reactive fatty acid may be a single unsaturated fatty acid with one or more conjugated double bonds, but is preferably a mixture of two or more fatty acids of which at least one is an unsaturated fatty acid with conjugated double bonds. A mixture of fatty acids can also include one or more saturated fatty acids. The fatty acids are preferably from 16 to 20 carbon atoms in length, but the 18 carbon length is most preferred. The fatty acid is preferably a mixture of from about 2% to about 22% monobasic saturated fatty acids and from about 98% to about 78% monobasic unsaturated fatty acids having one or more double bonds, preferably from one to four double bonds. The saturated fatty acids are preferably palmitic acid and stearic acid. The unsaturated fatty acids are preferably selected from the group consisting of palmitic, oleic, linoleic, linolenic, eleostearic and sometimes ricinoleic acids. The fatty acids (a) preferably have an acid number in the range of from about 130 to about 200, an iodine value of from about 130 to about 200 and have a percentage of conjugation of double bonds in the range of from about 10% to about 70%. The fatty acids (a) are used in an amount of from about 1 to about 3 parts by weight per part by weight of the vinyl monomer (b) contained in the polymerizable base (I).

The epoxy resin (II) is the reaction product of a compound having reactive hydrogens, such as a diol, such as Bisphenol A [2,2-bis(4-hydroxyphenyl) dimethylmethane] or Bisphenol F [2,2-bis(4-hydroxyphenyl) methane] or a dicarboxylic acid with epichlorohydrin. The epoxy resin preferably has an average epoxide equivalent weight of from about 250 to about 400, preferably about 300 to about 350. In an important embodiment of the present invention, the epoxy resin (II) is formed by chain extension of a low epoxide equivalent weight epoxy resin by reaction with Bisphenol A or Bisphenol F. Suitable commercially available epoxy resins for use as a low epoxide equivalent weight epoxy for this embodiment of the invention include: Araldite GY6010 which is an epoxy resin based on Bisphenol A and epichlorohydrin and which has an epoxy equivalent weight in the range of from about 182 to about 192, Araldite PY307 which is an epoxy novalac resin based on Bisphenol A and which has an epoxy functionality of 2.4, Araldite PY306 which is based on Bisphenol F and which has an epoxy equivalent weight in the range of from about 159 to about 170, and XB4122 which is a flexible epoxy based on Bisphenol A and which has an epoxy equivalent weight in the range of from about 333 to about 357 which are available from Ciba-Geigy Chemical Company; DER-736 which is a flexible epoxy which has an epoxy equivalent weight in the range of from about 175 to about 205 from Dow Chemical Company and DRH-151 which is an aliphatic epoxy having an epoxy equivalent weight from about 232 to about 238 and Shell Epon 828 from Shell Chemical Company. Generally the starting epoxy resin material can have an average epoxy equivalent weight in the range of about 150 to about 250 prior to chain extension. The epoxy resin (II) constitutes from about 20% to about 80% by weight of the epoxy ester copolymer resin of the invention.

A highly preferred embodiment of the invention includes the use of Araldite GY6010 which is chain extended with Bisphenol A to an epoxy equivalent weight of from about 300 to about 360. In this preferred embodiment the following ingredients are used in the preferred ranges shown:

| Reactant | Parts by Weight Based on Total Solids |
| --- | --- |
| GY 6010 | 25 to 35 |
| Bisphenol A | 4 to 6 |
| Chain Extension Catalyst such as triphenyl phosphine | 0.01 to 1 |

The monobasic acid (III) may be any $C_6$–$C_{20}$ monobasic acid and may be a straight or branched chain aliphatic monobasic acid, such as a fatty acid or may be an aromatic monobasic acid, such as benzoic acid. The monobasic acid (III) may be the same fatty acid or mixture of fatty acids as the fatty acid (a) and the discussion hereinabove of the fatty acids (a) is applicable to the monobasic acid (III). In an important embodiment of the invention, all or part of the monobasic acid (III) may be combined with fatty acid (a) and vinyl monomer (b) and reacted to provide polymerizable base (I). In this embodiment, if all of the monobasic acid (III) required to produce the epoxy ester copolymer of the invention is combined with fatty acid (a) and vinyl monomer (b), no additional monobasic acid (III) is added to the mixture of polymerizable base (I) and epoxy resin (II) during the final reaction. The monobasic acid (III) constitutes from about 5% to about 50% by weight of the epoxy ester copolymer resin of the invention.

Suitable initiators and catalysts are used in the preparation of the polymerizable compound (I) and the epoxy resin (II). A peroxide initiator is suitable to carry out the reaction of fatty acid (a) and vinyl monomer (b) to provide the polymerizable base (I). The preferred initiator is t-butyl perbenzoate, but other peroxides may be used, such as benzoyl peroxide, cumene hydroperoxide, and ditertiary butyl peroxide. Triphenyl phosphine and aryl phosphonium halides are suitable catalysts for the preparation of the epoxy resin (II). Zirconium napthenate is a suitable esterification catalyst during the final reaction.

In the process of the present invention, the epoxy ester copolymer resin is prepared by first reacting the fatty acid (a) and the vinyl monomer (b) in the presence of a polymerization catalyst for a time in the range of from about 1.5 hours to about 8.0 hours at a temperature in the range of from about 250° F. to about 350° F. to form compound (I). This reaction is preferably effected after the addition of a suitable organic solvent which is unreactive under the reaction conditions, although such organic solvent is not required for the reaction. The preferred organic solvent is xylene. The reaction to form compound (I) is considered to be complete when a constant viscosity has been attained.

Polymerizable base (I) is then mixed with the epoxy resin (II). The epoxy resin (II) is separately prepared by the reaction of a compound having reactive hydrogen, such as Bisphenol A or Bisphenol F, and a low equivalent weight epoxy resin at about 410° F. for about 1 hour. The monobasic acid (III) is then mixed with (I) and (II). The resulting mixture of (I), (II) and (III) is then reacted at a temperature of from about 250° F. to about 450° F. for a length of time sufficient to reduce the acid number of the copolymer resin produced by the reaction of (I), (II) and (III) to a value of about 10 or less. Solvent and unreacted vinyl monomer are removed by distillation along with reaction water during the esterification reaction. The resulting epoxy ester copolymer resin has a viscosity range of X-Z and an acid value of not more than about 10.

The epoxy, ester copolymer resin is then mixed with a suitable organic solvent to provide a flowable product with nonvolatile solids content of from about 69 to about 71% The organic solvent is preferably one that has strong solvent power, such as aromatic, alkylaromatic, ketone and ester solvents. The preferred organic solvents are n-butyl acetate and methyl isoamyl ketone. Other additives, such as pigments, dyes, fillers, metal driers, extenders and other agents, may be added to form a high solids epoxy ester copolymer coating.

A baking enamel system may be formed from the epoxy ester copolymer resin of the present invention through the use of suitable cross-linking agents, such as melamine, hexakis (methoxymethyl) melamine, isocyanates, isocyanurate, epoxides and aminoplasts.

The following examples are given to illustrate the invention and are not intended to be limiting on the invention. All materials are measured in parts or percent by weight unless otherwise indicated.

EXAMPLE I

A. Preparation of the Fatty Acid-Vinyl Monomer Compound (I)

A 2-liter reaction vessel is charged with 13.4 parts xylene, 31.12 parts mixed fatty acids (Pamolyn 300,* Hercules, Inc.) and 0.04 parts of linseed oil and is heated to 250° F. After attaining temperature, 0.04 parts t-butyl peroxide (catalyst) is added to the xylene solution followed by the slow addition over a period of three hours of a mixture of 46.65 parts styrene, 0.10 parts of acrylic acid and 1.74 parts t-butyl peroxide. The temperature is maintained between 250-265° F. during the styrene addition period. After completion of the styrene addition, the reaction mixture is held at 250°-265° F. for an additional 1 hour. Additional xylene, 6.6 parts, and t-butyl peroxide, 0.15 parts, are then mixed and added and the reaction is held at 250°-265° F. for a further 1 hour. The reaction mixture is cooled to 180° F. and filtered to yield a xylene solution of a polymerizable base (I) having a viscosity of X-Z and 73 to 75.3% NVM, as determined by ASTM D-1259-85.

*Pamolyn 30 has the following composition: Oleic acid 21%, total linoleic acids 79%, conjugated linoleic acid 40%, saturated acids <1%, rosin acids 1.5% and unsaponifiables 1.5%.

B. Preparation of the Epoxy Resin (II)

A 2-liter reaction vessel is charged with 29.28 parts of a liquid epoxy resin (Araldite GY 6010, Ciba-Geigy) having an epoxide equivalent weight of 182-192, 4.77 parts Bisphenol A and 0.03 parts triphenyl phosphine and heated to a temperature in the range of about 390° F. to about 415° F., where it is held for about 1.0 hour to provide an epoxy resin with a calculated epoxide equivalent weight of 300. The reaction mixture is then cooled to about 300° F.

C. Preparation of the High Solid Epoxy Ester Copolymer Resin

The 2-liter reaction vessel containing the epoxy resin (II) of Part B, above, cooled to 300° F., is charged with 34.09 parts of the product (I) of Part A, 10.0 parts of mixed fatty acids (Pamolyn 300) and 0.25 parts of 6% zirconium napthenate (catalyst). The reaction mixture is then heated to a reaction temperature of 450° F. for a sufficient length of time to reduce the acid number of the reaction mass to a value of 1.0 or less. During the reaction, the xylene, any unreacted vinyl monomer and any water formed during the reaction, are removed overhead under reflux. When the reaction mass has reached the specified acid value, the reaction mass is cooled to a temperature of about 240° F., mixed with 27.7 parts of n-butyl acetate for thinning and filtered into product containers. The resulting high solids, epoxy ester copolymer coating, resin has a viscosity of X-Z, is clear and has a nonvolatile content of about 70%.

EXAMPLE II

A. Preparation of the Fatty Acid-Vinyl Monomer Compound (I)

A 2-liter reaction vessel is charged with 13.4 parts xylene, 31.12 parts mixed fatty acids (Pamolyn 300,* Hercules, Inc.) and 0.04 parts of linseed oil and is heated to 250° F. After attaining temperature, 0.04 parts t-butyl peroxide (catalyst) is added to the xylene solution followed by the slow addition over a period of three hours of a mixture of 46.65 parts styrene, 0.10 parts of acrylic acid and 1.74 parts t-butyl peroxide. The temperature is maintained between 250°-265° F. during the styrene addition period. After completion of the styrene addition, the reaction mixture is held at 250°-265° F. for an additional 1 hour. Additional xylene, 6.6 parts, and t-butyl peroxide, 0.15 parts, are then mixed and added and the reaction is held at 250°-265° F. for a further 1 hour. The reaction mixture is cooled to 180° F. and filtered to yield a xylene solution of a polymerizable base (I) having a viscosity of X-Z and 73 to 75.3% NVM.

B. Preparation of the Epoxy Resin (II)

A 2-liter reaction vessel is charged with 24.19 parts of a liquid epoxy resin (Araldite GY 6010, Ciba-Geigy) having an epoxide equivalent weight of 182-192, 4.79 parts Bisphenol A and 0.03 parts triphenyl phosphine and heated to a temperature in the range of about 390° F. to about 415° F., where it is held for about 1.0 hour to provide an epoxy resin with a calculated epoxide equivalent weight of 335. The reaction mixture is then cooled to about 300° F.

C. Preparation of the High Solid Epoxy Ester Copolymer Resin

The 2-liter reaction vessel containing the epoxy resin (II) of Part B, above, cooled to 300° F., is charged with 40.36 parts of the product (I) of Part A, 10.0 parts of mixed fatty acids (Pamolyn 300) and 0.25 parts of 6% zirconium napthenate (catalyst). The reaction mixture is then heated to a reaction temperature of 450° F. for a sufficient length of time to reduce the acid number of the reaction mass to a value of 1.0. During the reaction, the xylene, unreacted vinyl monomer and any water formed during the reaction are removed overhead under reflux. When the reaction mass has reached the specified acid value, the reaction mass is cooled to a temperature of about 240° F., mixed with 27.7 parts of n butyl acetate for thinning and filtered into product containers. The resulting high solids, epoxy ester copolymer coating, resin has a viscosity of X-Z, is clear and has a non-volatile content of about 70%

EXAMPLE III

An epoxy ester copolymer resin is prepared in accordance with the procedure of Example I with the exception that Pamolyn 380 is used as the monobasic acid (III). Pamolyn 380 has the following composition: oleic acid 22%, total linoleic acids 78%, conjugated linoleic acid 70%, saturated acids <1%, rosin acids 1.5% and nonsaponifiables 2.0%. The resulting high solids, epoxy ester copolymer coating resin has a viscosity of X-Z, is clear and has a non-volatile content of about 70%.

EXAMPLE IV

A. Preparation of the Fatty Acid-Vinyl Monomer Compound (I)

A 2-liter reaction vessel is charged with 13.4 parts xylene, 31.12 parts mixed fatty acids (Pamolyn 300,* Hercules, Inc.) and 0.04 parts of linseed oil and is heated to 250° F. After attaining temperature, 0.04 parts t-butyl peroxide (catalyst) is added to the xylene solution followed by the slow addition over a period of three hours of a mixture of 46.65 parts styrene, 0.10 parts of acrylic acid and 1.74 parts t-butyl peroxide. The temperature is maintained between 250°-265° F. during the styrene addition period. After completion of the styrene addition, the reaction mixture is held at 250°-265° F. for an additional 1 hour. Additional xylene, 6.6 parts, and t-butyl peroxide, 0.15 parts, are then mixed and added and the reaction is held at 250°-265° F. for a further 1 hour. The reaction mixture is cooled to 180° F. to yield a xylene solution compound (I) having a viscosity of X-Z and 73 to 75.3% NVM.

B. Preparation of the Epoxy Resin (II)

A 2-liter reaction vessel is charged with 31.12 parts of a liquid epoxy resin (Araldite GY 6010, Ciba-Geigy) having an epoxide equivalent weight of 182-192, 5.18 parts Bisphenol A and 0.03 parts triphenyl phosphine and heated to a temperature in the range of about 390° F. to about 415° F., where it is held for about 1.0 hour to provide an epoxy resin with an epoxide equivalent weight of 300. The reaction mixture is then cooled to about 300° F.

C. Preparation of the High Solid Epoxy Ester Copolymer Resin

The 2-liter reaction vessel containing the epoxy base (II) of Part B, above, cooled to 300° F., is charged with 34.09 parts of the product (I) of Part A, 10.0 parts of mixed fatty acids (Pamolyn 380), 3.5 parts of Benzoic acid and 0.25 parts of 6% zirconium napthenate (catalyst). The reaction mixture is then heated to a reaction temperature of 450° F. for a sufficient length of time to reduce the acid number of the reaction mass to a value of 1.0 or less. During the reaction, the xylene plus any water formed during the reaction, are removed overhead under reflux. When the reaction mass has reached the specified acid value, the reaction mass is cooled to a temperature of about 240° F., mixed with 29.2 parts of n butyl acetate for thinning and is poured into product containers. The resulting high solids, epoxy ester copolymer coating resin has a viscosity of Y-Z, is clear and has a non-volatile nonvolative content of about 70%.

EXAMPLE V

A. Preparation of the Fatty Acid-Vinyl Monomer Compound (I)

A 2-liter reaction vessel is charged with 62.00 parts mixed fatty acids (Pamolyn 300, Hercules, Inc.) and is heated to 250° F. After attaining temperature, a mixture of 35.95 parts styrene, and 1.75 parts t-butyl peroxide is slowly added over a period of three hours. The temperature is maintained between 250°-265° F. during the styrene addition period. After completion of the styrene addition, the reaction mixture is held at 250°-265° F. for an additional 1 hours. Additional t-butyl peroxide, 0.15 parts, is then added and the reaction is held at 250°-265° F. for a further 1 hours. The reaction mixture is cooled to 180° F. and filtered to yield a xylene solution of polymerizable base (I) having a viscosity of $Z_1$-$Z_3$ and 94 to 96% NVM.

B. Preparation of the Epoxy Resin (II)

A 2-liter reaction vessel is charged with 31.12 parts of a liquid epoxy resin (Araldite GY6010, Ciba-Geigy) having an epoxide equivalent weight of 182-192, 5.18 parts Bisphenol A and 0.03 parts triphenyl phosphine and heated to a temperature in the range of about 390° F. to about 415° F., where it is held for about 1.0 hour to provide an epoxy resin with an epoxide equivalent weight of 300. The reaction mixture is then cooled to about 300° F.

C. Preparation of the High Solid Epoxy Ester Copolymer Resin

The 2-liter reaction vessel containing the epoxy resin (II) of Part B, above, cooled to 300° F., is charged with 46.74 parts of the product (I) of Part A, and 0.29 parts 6% zirconium napthanate (catalyst). and 0.25 parts of 6% zirconium napthenate (catalyst). The reaction mixture is then heated to a reaction temperature of 450° F. for a sufficient length of time to reduce the acid number of the reaction mass to a value of 1.0 or less. During the reaction, the xylene, any unreacted monomer and any water formed during the reaction are removed overhead under reflux. When the reaction mass has reached the specified acid value, the reaction mass is cooled to a temperature of about 220° F., mixed with 18.32 parts of n butyl acetate for thinning and filtered into product containers. The resulting high solids, epoxy ester copolymer coating resin has a viscosity of $Z_4$–$Z_5$, is clear and has a nonvolative content of about 80l%

EXAMPLE VI

A black air dry enamel was prepared from the epoxy ester copolymer of Example I in accordance with the following procedure:

a grind was prepared by adding the below listed components to a pebble mill and by grinding to a North Standard Hegman (N.S) of 7.5.

|  | Pounds | Gallons |
| --- | --- | --- |
| Epoxy ester copolymer from Example I | 200.00 | 23.96 |
| Filler and Extender (Imsil A-10-Illinois Minerals) | 91.81 | 4.16 |
| Suspension agent (Aerosil R-972 DeGussa) | 5.49 | 0.30 |
| Pigment (Special Black 4-Degussa) | 13.71 | 0.91 |
| Methyl isoamyl ketone | 46.40 | 6.84 |

The letdown was prepared by mixing the above grind with the following components

|  | Pounds | Gallons |
| --- | --- | --- |
| Epoxy ester copolymer from Example 1 | 363.96 | 44.00 |
| Metal drier (Manosec Cobalt 18%-Manchem) | 1.32 | 0.14 |
| Metal drier (Manosec Zirconium 18%-Manchem) | 4.41 | 0.48 |
| Chelating agent (Aktiv 8-R. T. Vanderbilt) | 1.59 | 0.20 |

| -continued | | |
| --- | --- | --- |
|  | Pounds | Gallons |
| Antiskinning agent (Exkin #2-Nuodex) | 0.99 | 0.13 |
| Flow Control additive (BYK-Chemie VSA | 0.79 | 0.10 |
| N-butyl acetate | 138.29 | 18.79 |
| Total for all components | 868.75 | 100 |

Testing of the above epoxy ester copolymer produced the results set forth hereinbelow:

|  | Pounds | Gallons |
| --- | --- | --- |
| PAINT PROPERTIES | | |
| Nonvolatiles (Weight Percent) | 58.90 | |
| (Volume Percent | 50.92 | |
| VOC (lBS/Gallon) Theoretical | 3.57 | |
| Actual | 3.59 | |
| Pigment to Binder Ratio | 0.28 | |
| Viscosity = 4 Zahn Cup | 18 Seconds | |
| CURED FILM PROPERTIES (7 Days Air Dry) | | |
| Through Dry (Circular Recorder) | 5 ¾ Hours | |
| Pencil Hardness | 2B | |
| Impact Resistance (Direct) | 70 | |
| Impact Resistance (Reverse) | <5 | |
| Adhesion | 100% | |
| Gloss (60/20) | 97/91 | |
| Salt Spray (214 Hours on CRS) | | |
| Scribe Creep | ¼ inch | |
| Scribe Blistering | Few #8 | |
| Surface Blistering | None | |
| Surface Corrosion | None | |
| QCT Humidity (294 hours on CRS) | | |
| Blistering | Dense #8 | |

EXAMPLE VII

The procedure of Example VI was used to produce a gray air dry enamel from the epoxy ester copolymer of Example I having the following components with the indicated properties.

|  | Pounds | Gallons |
| --- | --- | --- |
| Grind | | |
| Epoxy Ester Copolymer from Example I | 200.00 | 24.10 |
| Titanox 2090 (NL Industries) | 116.35 | 3.41 |
| Raven 14 (CITCO) } Pigment | 3.72 | .25 |
| Methyl Isoamyl Ketone | 40.00 | 5.90 |
| Letdown | | |
| Epoxy Ester Copolymer from Example I | 369.32 | 44.50 |
| Cobalt 18% (Manchem) | 1.33 | 0.15 |
| Zirconium 18% (Manchem) | 4.45 | 0.48 |
| Activ-8 (R. T. Vanderbilt) | 1.60 | 0.20 |
| Exkin #2 (Nuodex) | 1.00 | 0.13 |
| Byk 300 (Byk-Chemie) | 0.80 | 0.10 |
| Byk P-104 (Byk-Chemie) | 2.40 | 20.48 |
| Methyl Isoamyl Ketone | 138.82 | 100.00 |
| PAINT PROPERTIES | | |
| Weight per Gallon: | 8.80 | |
| Nonvolatiles (Weight): | 59.71% | |
| Nonvolatiles (Volume): | 49.74 | |
| Theoretical VOC: | 3.54 Lbs/Gal | |
| Actual VOC: | 3.43 Lbs/Gal | |
| Pigment to Binder Ratio: | 0.30 | |
| Viscosity = 4 Zahn Cup: | 20 Seconds | |
| CURED FILM PROPERTIES (7 Days Air Dry) | | |
| Through Dry (Linear Recorder) | 7 Hours | |
| Pencil Hardness | B | |
| Adhesion to CRS (Crosshatch) | 100% Pass | |
| Impact Resistance (Direct) | 30 | |
| Impact Resistance (Reverse) | <5 | |
| Gloss (60/20) | 97/87 | |
| Salt Spray (195 Hours on CRS) | | |

| | Pounds | Gallons |
|---|---|---|
| Scribe Creep: | 1" | |
| Scribe Blistering: | Med. #6-8 | |
| Surface Blistering: | Slight | |
| Surface Corrosion: | Slight | |
| QCT Humidity (358 Hours on CRS) | | |
| Blistering: | Med. #8 | |
| Adhesion Loss: | 20% | |
| Recoatability Test (1,2,4,8,16,24 Hours) | Pass | |

What is claimed is:

1. An epoxy ester copolymer resin having an acid value below about 10 and for use in conjunction with an organic solvent to provide a flowable resin, the epoxy ester copolymer resin comprising the reaction product of a mixture of:
   (i) a polymerizable base (I) which is the free radical polymerized reaction product of (a) a fatty acid having free radical polymerizable double bonds in addition to (b) a vinyl monomer selected from the group consisting of styrene, alpha-methyl styrene, vinyl toluene and mixtures thereof;
   (ii) an epoxy resin (II); and
   (iii) a monobasic acid (III), the polymerizable base being prepared prior to the reaction of the base with the epoxy resin and wherein the monobasic acid (III) is the fatty acid used to make the polymerizable base (I) or is reacted with the polymerizable base and epoxy resin.

2. A resin in accordance with claim 1 wherein said fatty acid (a) is a mixture of fatty acids at least one of which is a monobasic, unsaturated fatty acid having at least one conjugated double bond.

3. A resin in accordance with claim 1 wherein said monobasic acid (III) is an organic acid having from 6 to 20 carbons selected from the group consisting of straight chain aliphatic acids, branched chain aliphatic acids, aromatic acids and mixtures thereof.

4. A resin in accordance with claim 1 wherein said polymerizable base (I) is from about 10% by weight to about 70% by weight of said resin, the epoxy resin (II) is from about 20% by weight to about 80% by weight of said resin, and the monobasic acid (III) is from about 5% to about 50% by weight of said resin.

5. A resin in accordance with claim 1 wherein said fatty acid (a) or said monobasic acid (III) is a mixture of fatty acids having from 16 to 20 carbons in length, having an acid number from about 130 to about 200, having an iodine value of from about 130 to about 200 and having a percentage of conjugated double bonds of from about 10% to about 70%.

6. A resin in accordance with claim 1 where said polymerizable base (I) is from about 10% by weight to about 70% by weight of said resin, the epoxy resin (II) is from about 20% by weight to about 80% by weight of said resin, and the monobasic acid (III) is from about 5% to bout 50% by weight of said resin;
   said fatty acid (a) is a mixture of fatty acids having from 16 to 20 carbon atoms in length, having an acid number from about 130 to about 200, having an iodine value of from about 130 to about 200 and having a percentage of conjugated double bonds of from about 10% to about 70%; and
   said monobasic acid (III) is an organic acid having from 6 to 20 carbons selected from the group consisting of straight chain aliphatic acids, branched chain aliphatic acids, aromatic acids and mixtures thereof.

7. A resin in accordance with claim 6 wherein the vinyl monomer is styrene.

8. A resin accordance with claims 6 or 7 wherein said mixture of fatty acids (a) is selected from the group consisting of palmitic, oleic, linoleic, linolenic, eleostearic, ricinoleic and mixtures thereof.

9. A resin in accordance with claims 6 or 7 wherein said epoxy resin has an epoxide equivalent weight of from about 250 to about 400.

10. A resin in accordance with claim 8 wherein said epoxy resin is in the reaction product of Bisphenol A or Bisphenol F with an epoxy resin having an average epoxide equivalent weight of from about 150 to about 250.

11. A resin in accordance with claims 1, 6 or 7 wherein said polymerizable base (I) is prepared by reaction of at least part of said monobasic acid (III) in combination with said fatty acid (a) and said vinyl monomer.

12. A resin in accordance with claims 1, 6 or 7 wherein all of said monobasic acid (III) is used in the preparation of said polymerizable base (I).

13. A resin in accordance with claims 1, 6 or 7 wherein the polymerizable base includes an additional vinyl monomer other than styrene, alpha-methyl styrene or vinyl toluene and mixtures thereof.

14. A resin in accordance with claims 9 wherein the polymerizable base includes an additional vinyl monomer other than styrene, alpha-methyl styrene or vinyl toluene and mixtures thereof.

* * * * *

UNITED STATES PATENT AND TRADEMARK OFFICE
CERTIFICATE OF CORRECTION

PATENT NO. : 5,124,406

DATED : June 23, 1992

INVENTOR(S) : Rolando et al.

It is certified that error appears in the above-identified patent and that said Letters Patent is hereby corrected as shown below:

TITLE PAGE:

Title Page, Other Publications, line 8, change "28,2996" to --28,996--.

Title Page, Other Publications, line 12, change "12353d" to --123263d--.

Title Page, Other Publications, line 19, change "C08J3/06" to --C08J3/06--.

Column 1, line 46, after "useful" delete the comma; and after "primer" delete the comma.

Column 2, line 9, change "130.F." to --130°F.--.

Column 2, line 10, change "230.F." to --230°F.--.

Column 3, line 27, after "butyl" delete "metracrylate".

Column 4, line 13, after "357" insert a comma.

Column 5, line 36, after "epoxy" delete the comma.

UNITED STATES PATENT AND TRADEMARK OFFICE
CERTIFICATE OF CORRECTION

PATENT NO. : 5,124,406
DATED : June 23, 1992
INVENTOR(S) : Rolando et al.

It is certified that error appears in the above-identified patent and that said Letters Patent is hereby corrected as shown below:

```
Column 6, line 10, after "pamolyn" change "30" to --300--.
Column 6, line 42, after "coating" delete the comma.
Column 7, line 29, after "coating" delete the comma.
Column 8, line 40, change "hours" to --hour--.
Column 8, line 43, change "hours" to --hour--.
Column 9, line 9, change "nonvolative" to --nonvolatile--.

Column 12, line 14, change "bout" to --about--.
```

Signed and Sealed this

Twenty-fifth Day of January, 1994

Attest:

BRUCE LEHMAN

Attesting Officer

Commissioner of Patents and Trademarks